US 6,952,658 B2

(12) United States Patent
Greulich et al.

(10) Patent No.: US 6,952,658 B2
(45) Date of Patent: Oct. 4, 2005

(54) SYSTEM FOR DETERMINING FAULT CAUSES

(75) Inventors: Manuel Greulich, Oberwolfach (DE); Gerhard Vollmar, Meckenheim (DE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 10/364,004

(22) Filed: Feb. 10, 2003

(65) Prior Publication Data

US 2004/0158434 A1 Aug. 12, 2004

(30) Foreign Application Priority Data

Aug. 9, 2000 (EP) .................................. PCT/EP00/07730

(51) Int. Cl.$^7$ .............................................. G06F 11/32
(52) U.S. Cl. ...................................... 702/185; 702/183
(58) Field of Search ............................... 700/1, 28, 51, 700/79, 95, 108, 109, 110, 111; 702/127, 179, 182, 183, 185, 187; 714/1, 2, 100, 124, 127

(56) References Cited

U.S. PATENT DOCUMENTS

| | | | | |
|---|---|---|---|---|
| 4,866,635 A | * | 9/1989 | Kahn et al. | 706/46 |
| 4,954,964 A | * | 9/1990 | Singh | 706/11 |
| 5,067,099 A | * | 11/1991 | McCown et al. | 702/183 |
| 5,107,500 A | * | 4/1992 | Wakamoto et al. | 714/26 |
| 5,566,092 A | * | 10/1996 | Wang et al. | 702/185 |
| 5,793,933 A | * | 8/1998 | Iwamasa | 706/45 |
| 6,049,792 A | * | 4/2000 | Hart et al. | 706/10 |
| 6,760,639 B2 | * | 7/2004 | Kallela et al. | 700/111 |
| 2003/0135786 A1 | * | 7/2003 | Vollmar et al. | 714/25 |

FOREIGN PATENT DOCUMENTS

| EP | 0 338 561 A2 | 10/1989 |
|---|---|---|
| EP | 0 508 571 A2 | 10/1992 |

OTHER PUBLICATIONS

Roberge, P; "Handbook of Corrosion Engineering"; McGraw–Hill; ISBN 0–07–076516–2; 1999; pp ix–xi and 267–329.*
Mobley, K; "Root Cause Failure Analysis"; Butterworth–Heinemann; ISBN 0–7506–7158–0; 1999; pp 6–57.*
Lees, F; "Loss Prevention in the Process Industries: Hazard Identification, Assessment and Control"; Butterworth–Heinemann; ISBN 0–7506–1547–8; vol. 1, 2, 3 2nd edition; 1996; pp 7/1–7/70.*
Dugan, J; Sullivan, K; Coppit, D; "Developing a Low–Cost High–Quality Software Tool for Dynamic Fault–Analysis"; IEEE Transactions on Reliability; vol. 49, issue 1; Mar. 2000; pp 49–59.*
Geymayr, J; Ebecken, N; "Fault–Tree Analysis: A Knowledge–Engineering Approach"; IEEE Transactions on Reliability; vol. 44, issue 1; Mar. 19956; pp 37–45.*

(Continued)

Primary Examiner—John Barlow
Assistant Examiner—Douglas N Washburn
(74) Attorney, Agent, or Firm—Laurence A. Greenberg; Werner H. Stemer; Ralph E. Locher

(57) ABSTRACT

A system for determining fault causes, including automated determination of hypotheses in the context of a fault cause analysis and automated performance of hypotheses verification, has a data processing device connected to a data input and visualization device and to a data memory. The data processing device contains a processing unit for fault cause analysis, a first comparator, a second comparator and a hypothesis selector. The data memory contains a general fault model, a fault event list, an empirical database and a storage area to store a log of the current fault cause analysis. The data processing device, following the selection of a fault event from the displayed fault event list by a user, to display to the latter hypotheses suggested by the system, following the selection of hypotheses to be verified, to carry out hypotheses verification and, as the result, to log and display determined fault causes.

4 Claims, 8 Drawing Sheets

OTHER PUBLICATIONS

Weber, D; "Fuzzy Fault Tree Analysis"; IEEE World Congress on Computational Intelligence Proceedings of 3rd IEEE Conference on Fuzzy Systems; vol. 3; Jun. 26–29, 1994; pp 1899–1904.*

Madan Mohan, T; "Fault–Tree Analysis of Technological Failures"; 'Managing Projects in a Borderless World' Pre-Conference Proceedings, IEEE Int'l Engineering Management Conference; Dec. 17–18, 1993; pp 133–142.*

Fukuyama, Y; Ueki, Y; "Fault Analysis System Using Neural Networks and Artificial Intelligence"; Proceedings of the 7th Int'l Forum on Applications of Neural Networks to Power Systems; Apr. 19–22, 1993; pp 20–25.*

Ian Watson: "Applying Case–Based Reasoning: Techniques for Enterprise Systems", Morgan Kaufmann Publishers, Inc., 1997, pp. 23–33.

* cited by examiner

FAULT EVENT - CHANGING THE WORKING ROLLS

<u>DESCRIPTION</u>

*FAULT TEXT:*
ROUTINE MAINTENANCE AFTER REACHING THE AVERAGE TOTAL ROLLING LENGTH

*EFFECTS:*
STOPPAGE OF THE HOT-ROLLING PLANT IN THE SPECIFIED PERIOD.

*TIME:*   START: 30.10.99   9:16
           END:   30.10.99   12:06

*FAULT CODE:* 33
*FAULT LOCATION:*
4 HI STAND/HOT-ROLLING PLANT

<u>PROCESS CONTEXT</u>

*RELEVANT PROCESS DATA:*
TOTAL ROLLING LENGTH (DELTA_X), OTHERWISE NO FURTHER PROCESS DATA REQUIRED.

*ENTRY IN OPERATOR LOGBOOK*
ENTRY #2319
HOT-ROLLING PLANT STOPPED BECAUSE OF MAINTENANCE.

*ENTRY IN MAINTENANCE BOOK*
ENTRY #422
REPLACEMENT OF THE WORKING ROLLS/4 HI STAND IN ACCORDANCE WITH MAINTENANCE PLAN.
INSPECTION OF THE PLANT SHOWED NO CAUSE FOR CONCERN.

FIG. 3

FAULT HYPOTHESIS- FAULT IN THE CLEANING PLANT

DESCRIPTION:...

COMPONENT/SYSTEM : CLEANING PLANT

CHECKLIST

NOTCHES IN THE STEEL PLATE?
      DIAGNOSTIC EFFORT: LOW

BLACK SPOTS ON THE STEEL PLATE?
      DIAGNOSTIC EFFORT: LOW

IMPRINT ON THE WORKING ROLL?
      DIAGNOSTIC EFFORT: MEDIUM

FAULT TREE REFERENCE
  CLEANING PLANT

FIG. 6

SYSTEM FOR DETERMINING FAULT CAUSES

BACKGROUND OF THE INVENTION

Field of the Invention

The invention relates to a system for determining fault causes, including computer-aided production of hypotheses, and for carrying out their verification within the context of a fault cause analysis. The system is suitable for assisting the search for causes of faults in the case of fault events that occur in industrial plants.

Different methods and techniques can be used for fault cause analysis. These include fault tree analysis or fault cause analysis (root cause analysis) in diverse variants, as described, for example, in the references by Reliability Center, Inc., titled "Root Cause Failure Analysis Methods" Hopewell, USA, 1997 and by ASB Group Inc., titled "Risk and Reliability Division", "Root Cause Analysis Handbook", "A Guide to Incident Investigation", Knoxville, USA, 1999.

During such a fault cause analysis, typically the following steps are performed:

1. Carrying out a failure mode and effects analysis (FMEA) to determine the really important faults.
2. Performing the actual fault cause analysis for each of the significant faults. In this case, the following substeps are performed:
   a) Securing all the necessary information which permits conclusions about the course and causes of the fault, for example damaged components, position of the same, interviews with operators, process data and so on.
   b) Organizing the fault cause analysis. Defining the necessary resources and performance plan.
   c) Actual analysis, for example using fault trees, and determining the fault causes. In this case, fault trees are created with which, starting from the fault event, the fault causes can be determined over a plurality of cause levels.
3. Implementing the improvements. For this purpose, the fault causes determined and recommendations for remedial measures are communicated to the appropriate decision-maker and an action plan is defined, according to which the recommendations are carried out. Once this action plan has been completed successfully, the analysis has been completed.

Hypotheses for fault causes are needed in step 2C if, starting from the fault event, the question is repeatedly posed as to what could lead to the fault event. Hypotheses are therefore assumptions about the fault cause that are based on empirical knowledge. Hypotheses are verified by the previously secured information about the fault being used, and therefore the hypothesis can be confirmed or refuted. If a hypothesis is confirmed in this way, then the situation described by the hypothesis becomes a real fact. For this fact, it is in turn possible to pose the question as to what could lead to this fact, that is to say further hypotheses are drawn up.

The drawback with the known methods is that drawing up hypotheses and verifying them depends on the experience of the fault analyst or analysts. Even if suitable fault trees, for example generated from fault models, are available, these cannot yet be used directly for the present fault analysis. Instead, such fault trees and also the hypotheses contained therein have to be adapted to the specific fault event to be investigated. For this purpose, an experienced fault analyst is needed.

SUMMARY OF THE INVENTION

It is accordingly an object of the invention to provide a system for determining fault causes that overcomes the above-mentioned disadvantages of the prior art devices of this general type, which permits automated determination of hypotheses and their verification within the context of a fault cause analysis required for the purpose.

With the foregoing and other objects in view there is provided, in accordance with the invention, a system for determining fault causes. The system automatically determines hypotheses in a context of a fault cause analysis and performs an automated performance of hypotheses verification. The system contains a data input and visualization device, and a data memory having a general fault model, a fault event list, an empirical database and a storage area for storing a log of current fault cause analysis. A data processing device is connected to the data input and visualization device and to the data memory. The data processing device contains a processing unit for performing the fault cause analysis, a first comparator connected to the processing unit, a second comparator connected to the processing unit, and a hypothesis selector connected to the processing unit. Following a selection by a user of a fault event provided by the fault event list, the data processing device displays possible hypotheses to the user, carries out a hypotheses verification process on selected hypotheses and, logs and/or displays determined fault causes.

The system assists a user during the analysis of selected fault events by making proposals for the processing of a general fault model. These proposals relate to a suitable entry point to the model and, in particular, suitable hypotheses and verification possibilities that permit efficient performance of the fault cause analysis. For this purpose, the system makes use of experience which has been obtained in fault analyses already carried out and which are available in an empirical library.

In accordance with an added feature of the invention, the data input and visualization device includes a web browser. The use of the data input and visualization device permits the user to make entries and to display intermediate and final results from analyses.

In accordance with another feature of the invention, the processing device displays to the user the fault event list and stores a fault event selected by the user or selected fault events in the log of the current fault cause analysis. The processing device uses the first comparator to compare a description of the fault event belonging to a selected current fault event with contents of a general fault model and, from the general fault model, displays suitable fault trees for carrying out a further analysis and, following selection of a fault tree, stores the fault tree in the log of the current fault cause analysis. The processing device uses the second comparator to compare the description of the selected current fault event with empirical fault analyses from the empirical database and displays suitable empirical fault analyses, and, following selection of the empirical fault analyses, stores the empirical fault analyses in the log of the current fault cause analysis. The processing device uses the hypothesis selector to summarize and display in a list the hypotheses contained in a selected empirical fault analyses and, following selection of the hypotheses, stores the selected hypotheses in the log of the current fault cause analysis. The processing device uses stored data from the log of the current fault cause analysis, to process the general fault model and in the hypotheses verification process and, after the hypotheses verification process, stores the determined fault causes in the log of the current fault cause analysis.

Other features which are considered as characteristic for the invention are set forth in the appended claims.

Although the invention is illustrated and described herein as embodied in a system for determining fault causes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 shows a description of a current fault event;

FIG. 6 shows important contents of a fault hypothesis;

DESCRIPTION OF THE PREFERRED EMBODIMENTS

Figure 1:
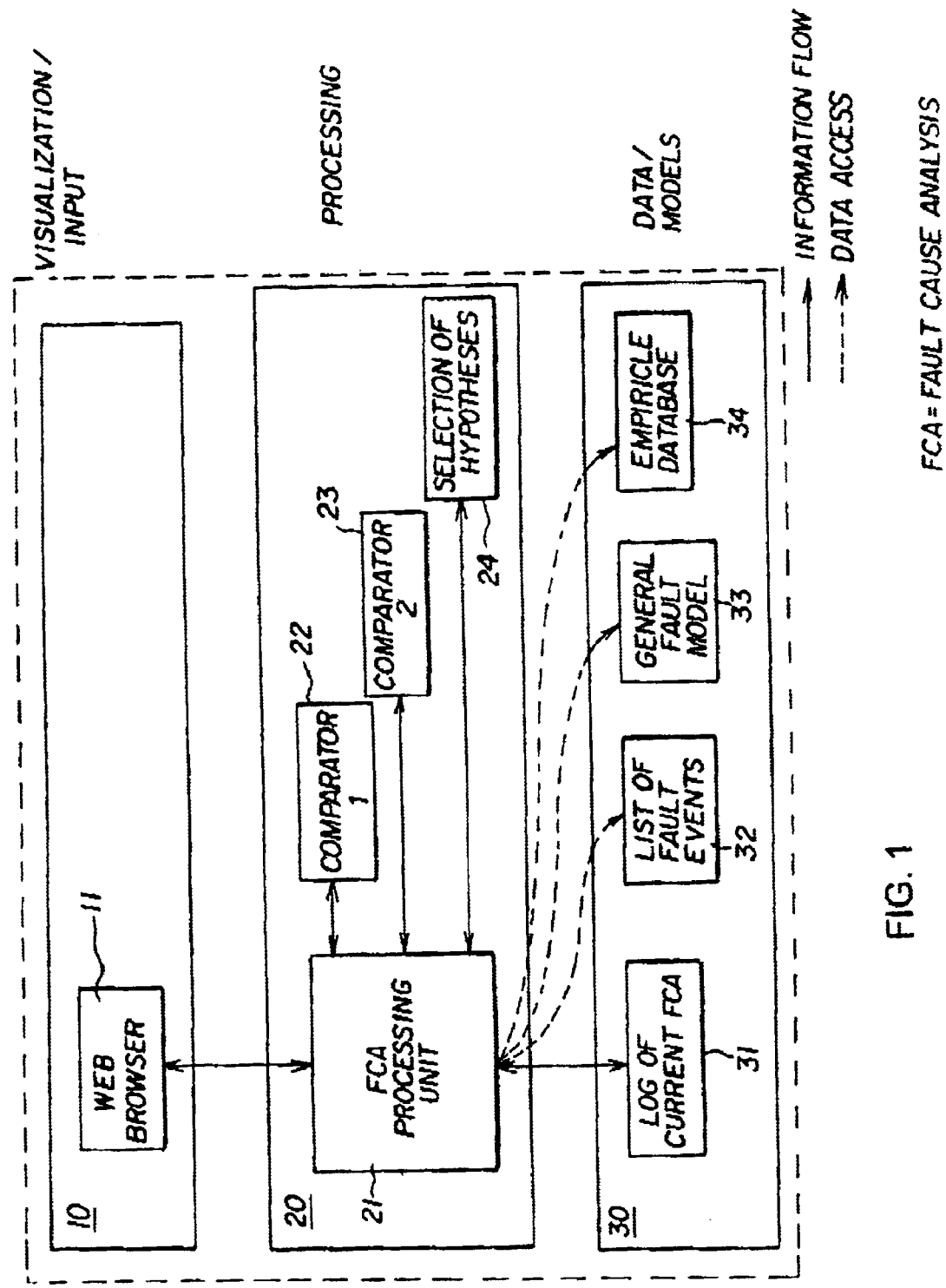
FIG. 1 is a block schematic diagram of a system according to the invention for the automatic generation of hypotheses and their verification in order to determine fault causes.

Referring now to the figures of the drawing in detail and first, particularly, to FIG. 1 thereof, there is shown a system that can be implemented and used locally in a computer. However, an implementation in the Internet is preferred, since then world-wide utilization for service purposes is readily possible.

FIG. 1 shows the schematic diagram of a system for the automatic generation of hypotheses and their verification in order to determine fault causes. The system is divided into a device for data input and visualization 10, a data processing device 20 and a data memory 30. A conventional web browser 11 forms part of the device for data input and visualization 10. The data processing device 20 contains a processing unit 21 for fault cause analysis, which coordinates the processing of the fault cause analysis. Further components are available for the processing and assist detailed steps, namely a first comparator 22, a second comparator 23 and a hypothesis selector 24. The processing unit 21 for fault cause analysis uses data from the data memory 30, access being made to a fault event list 32, a general fault model 33 and an empirical database 34. Intermediate and final results from the fault cause analysis are saved in a log of the current fault cause analysis 31. Included in the log 31 are: the respectively selected current fault event with a description, a suitably entry point into the general fault model, selected empirical fault analyses, a list of selected empirical fault hypotheses and the result of the fault cause analysis, that is to say the determined fault causes. User inputs are requested by the processing unit 21 for fault cause analysis via the web browser 11. Results are displayed to the user via the web browser 11.

Figure 2:
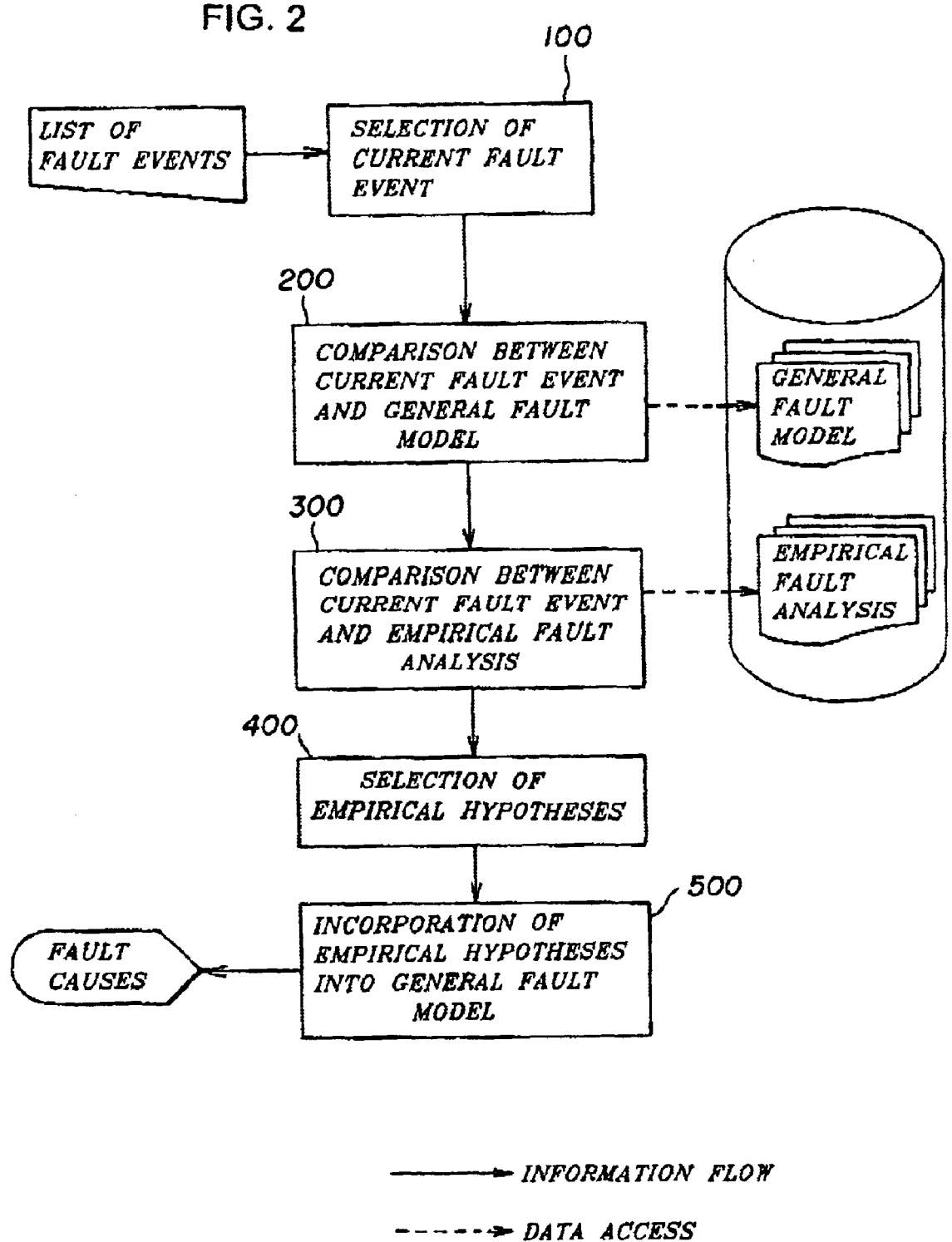
FIG. 2 is a flow chart describing the way in which the system works.

FIG. 2 shows a flowchart for illustrating the way in which the system works.

In step 100, the user selects via the web browser interface 11 a fault event to be investigated from the list of fault events 32 and stores it in the component log of the current fault cause analysis 31. The description of the current fault event will be explained in more detail in FIG. 3.

Figure 4:
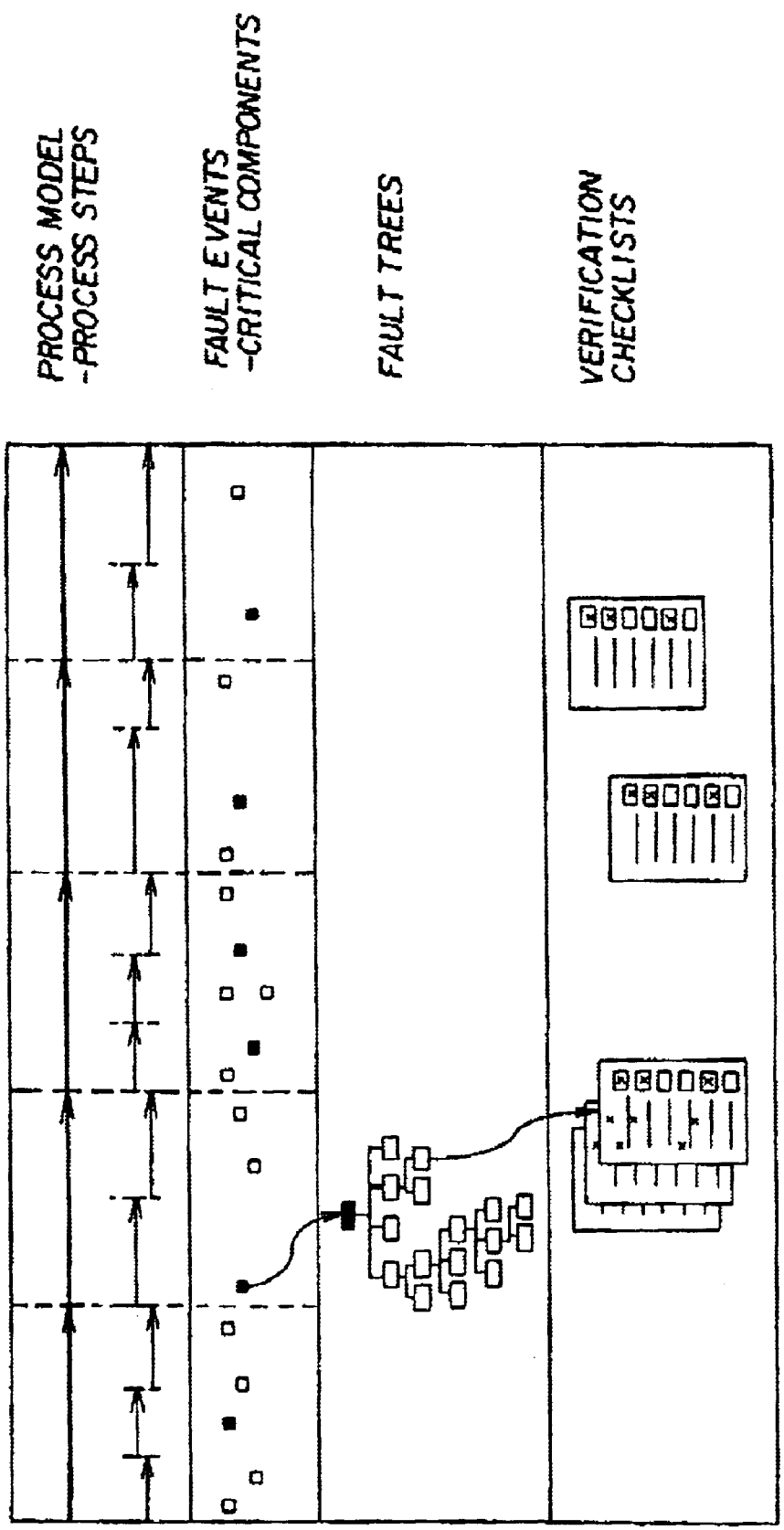
FIG. 4 is a basic illustration of a general fault model.
Figure 7:
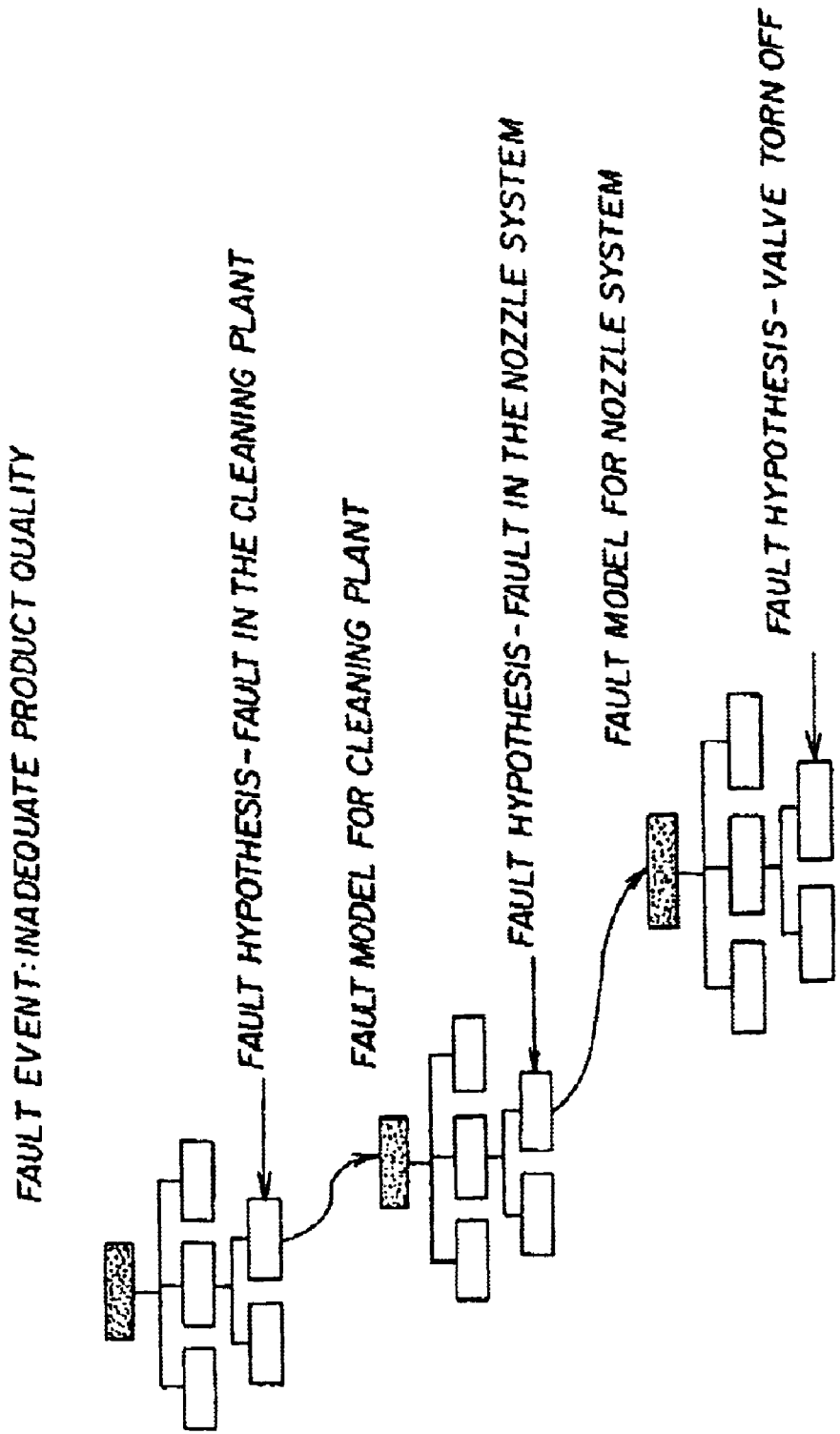
FIG. 7 shows fault models which refer to one another.

In step 200, by use of the first comparator 22, the system compares the description of the current fault event (see FIG. 3) with the contents of the general fault model 33 and suggests entry points for the fault analysis. In the process, the system uses the common attributes of the description of the current fault event and of the general fault model, such as fault title, fault text, effects, fault code and fault location, and checks their values for equality or similarity. A suitable method that provides this checking is, for example, the nearest-neighbor method [see the reference by I. Watson, titled "Applying Case-Based Reasoning: Techniques for Enterprise Systems", Morgan Kaufmann Publishers, Inc., San Francisco, 1997, pages 23 to 33]. The structure of the general fault model is shown in FIG. 4, FIG. 6 and FIG. 7. If the system suggests a plurality of suitable fault trees as an entry point for the fault analysis, the user selects the most suitable. The system stores a description of the entry point in the component log of the current fault cause analysis 31.

In step 300, by use of the second comparator 23, the system compares the description of the current fault event with the empirical fault analyses from the empirical database 34 and suggests suitable empirical fault analyses. In a way similar to that in step 200, here the system compares the common attributes of the current fault event and the empirical fault analyses. The nearest-neighbor method is also suitable here for the similarity checking. An empirical fault analysis shows how and with what result a fault event was analyzed. In particular, the decisive hypotheses in the course of the analysis and their verification are summarized in a list. The user selects the most suitable empirical fault analyses. The system stores these empirical fault analyses in the component log of the current fault cause analysis 31.

In step 400, by use of the component hypothesis selector 24, the system assembles the lists of all the selected empirical hypotheses and suggests to the user the candidates for a current fault analysis. Here, account is taken in particular of the hypotheses which:

a) occurred in many fault analyses;

b) had a key role in the identification of the cause since, for example, the associated verifications had a particular implication;

c) were classified as particularly important by those carrying out the analysis, for example because an entire cause complex could be delimited with one investigation; or d) which could be verified with very little effort.

The user selects the hypotheses that he wishes to use in the context of the current fault analysis. The system stores the empirical hypotheses in the component log of the current fault cause analysis 31.

In step 500, the hypotheses selected in step 400 are incorporated into the processing of the general fault model. In order to carry out the fault analysis, the system follows the general fault model and processes the hypotheses contained therein. In the case of each hypothesis, the system checks, by comparing the attributes, whether suitable empirical hypotheses are present. In this case, the empirical hypothesis including verification is used, otherwise the hypothesis from the general model is retained. The system stores the fault causes determined as the result of the fault cause analysis in the component log of the current fault cause analysis 31.

FIG. 3 shows a representation of a current fault event. For this purpose, the fault event is described in the attributes fault text, effects of the fault, time at which the fault occurred, the fault code used internally from the fault code list, and the fault location. In addition, reference is made to further system records that reproduce the process situation at the time of the fault. These include the process data that are recorded from the control system, the operator logbook and the working reports from the maintenance management system.

FIG. 4 shows the basic representation of a fault model. The top level contains a process model with a plurality of process steps. Each process step can be subdivided into further process steps. In relation to each process step there are fault events and critical process components.

Figure 5:
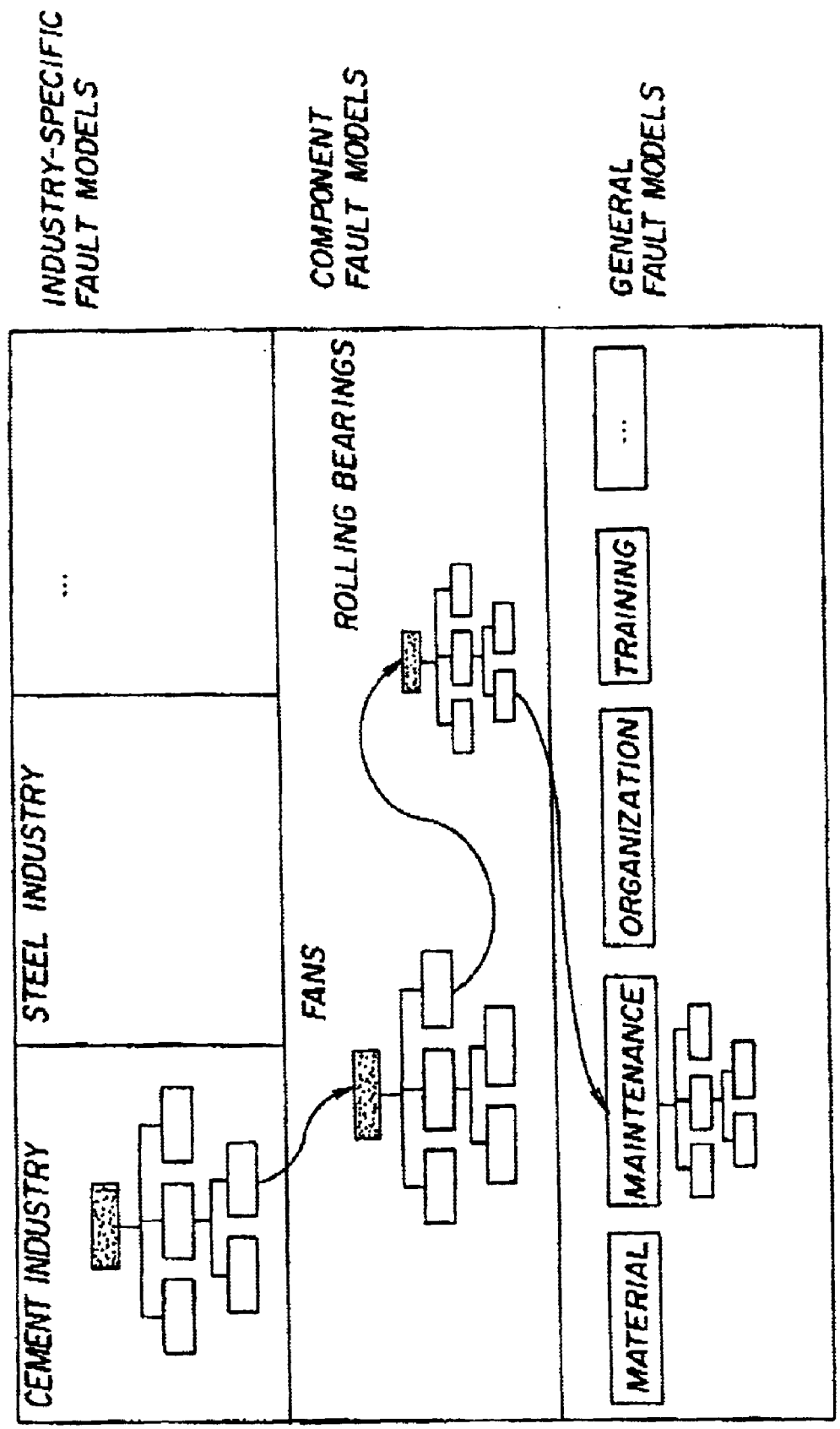
FIG. 5 is an illustration for categorizing the fault models.

The next lower level of the model contains fault trees. Fault trees are categorized as can be seen in FIG. 5. A fault tree can be assembled from a plurality of part trees. This is indicated in FIG. 5 by the arrows and explained in more detail in FIG. 7.

The nodes of a fault tree represent fault hypotheses. An important part of the contents of a fault hypothesis is a checklist relating to verification. The contents of a hypothesis will be explained in more detail in FIG. 6.

FIG. 5 shows the categorization of the fault models. The industry-specific fault models created for this purpose are in each case typical of a specific industry, such as fault models for the cement industry or fault models for the steel industry, for example. The category of fault models has the fault event as the top node. A fault event is an undesired state that impairs production.

A second category according to FIG. 5 describes component faults. These models are more generally applicable and can therefore be applied in different industries. Typically, hypotheses in the industry-specific fault models refer to component fault models.

The third category of fault models describes very generally applicable fault relationships. Such faults have their causes, for example, in inadequate training of the employees, deplorable organizational states or problems in maintenance. These models are placed below the industry-specific fault models and the component fault models.

FIG. 6 shows the important contents of a fault hypothesis using the example of a cleaning plant for steel plates. The hypothesis includes a description of the fault relationships. In addition, the hypothesis is assigned the affected components or the affected part system. A checklist describes criteria relating to how the hypothesis can be verified. For each criterion, the effort for the diagnosis is also specified. The hypothesis can be based on complex, independent fault trees. This reference is in the fault tree reference.

FIG. 7 shows, by using the example of the fault event "inadequate product quality", how fault trees refer to one another and how in this way complex and comprehensive fault relationships can be modelled.

Figure 8:
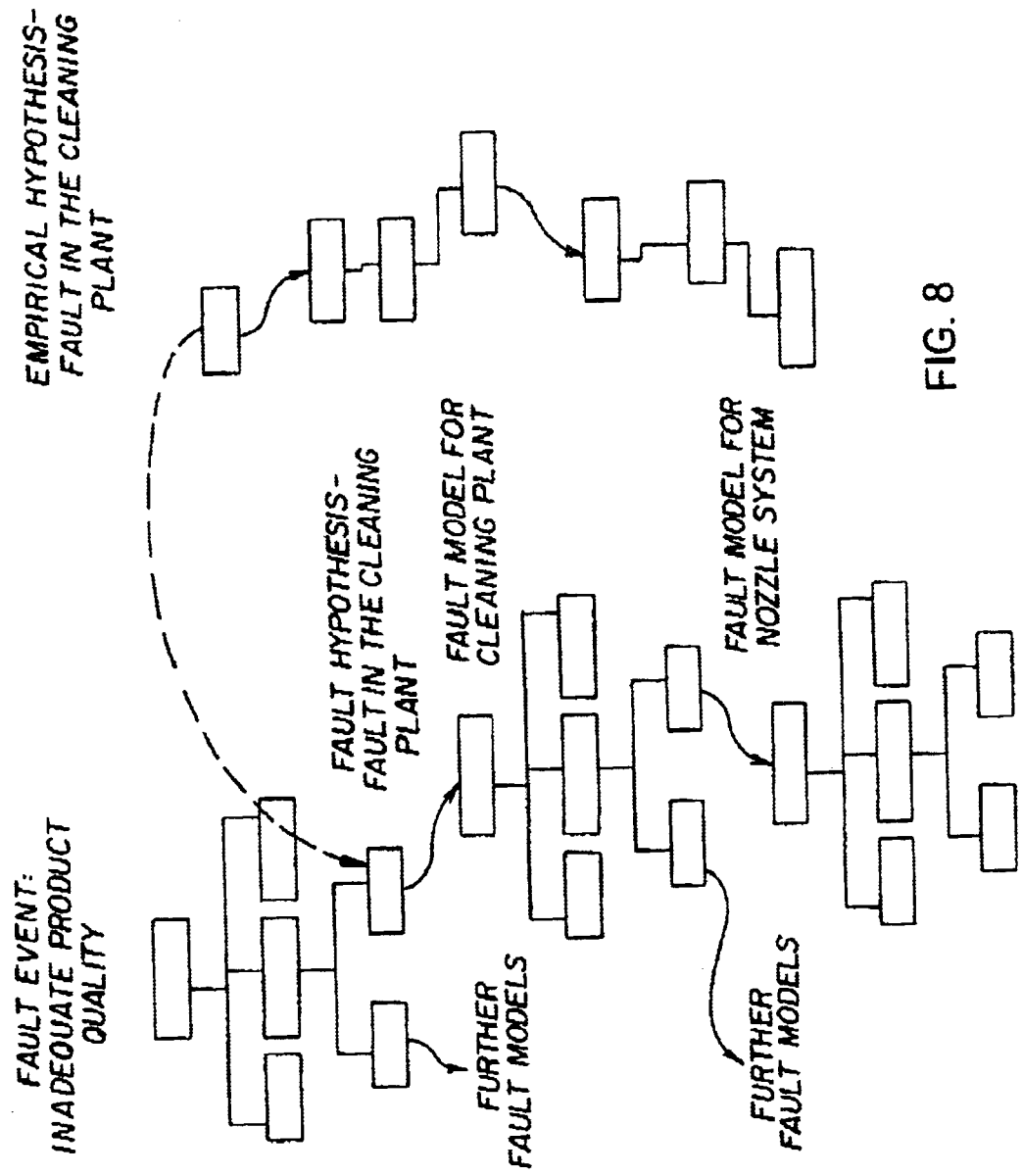
FIG. 8 shows the incorporation of an empirical hypothesis into the processing of the general fault model.

FIG. 8 takes the example from FIG. 7 and shows how the fault hypothesis "fault in the cleaning plant" is replaced, in the processing of the general fault model, by a suitable empirical hypothesis. The entire fault tree (on the left in the illustration) can be replaced by the considerably smaller fault tree from the empirical hypothesis (on the right in the illustration), which can considerably reduce the effort for the processing.

We claim:

1. A system for determining fault causes, the system automatically determining hypotheses in a context of a fault cause analysis and performing an automated performance of hypotheses verification, the system comprising:
   a data input and visualization device;
   a data memory containing a general fault model, a fault event list, an empirical database and a storage area for storing a log of current fault cause analysis; and
   a data processing device connected to said data input and visualization device and to said data memory, said data processing device containing a processing unit for performing the fault cause analysis, a first comparator connected to said processing unit, a second comparator connected to said processing unit, and a hypothesis selector connected to said processing unit, following a selection by a user of a fault event provided by the fault event list, said data processing device displaying possible hypotheses to the user, carrying out a hypotheses verification process on selected hypotheses and, one of logging and displaying determined fault causes.

2. The system according to claim 1, wherein said data input and visualization device includes a web browser, a use of said data input and visualization device permitting the user to make entries and to display intermediate and final results from analyses.

3. The system according to claim 1, wherein said processing device is programmed to:
   display to the user the fault event list and to store the fault event selected by the user or selected fault events in the log of the current fault cause analysis;
   use said first comparator to compare a description of the fault event belonging to a selected current fault event with contents of a general fault model and, from the general fault model, to display suitable fault trees for carrying out a further analysis and, following selection of a fault tree, to store the fault tree in the log of the current fault cause analysis;
   use said second comparator to compare the description of the selected current fault event with empirical fault analyses from said empirical database and to display suitable empirical fault analyses, and, following selection of the empirical fault analyses, to store the empirical fault analyses in the log of the current fault cause analysis;
   use said hypothesis selector to summarize and display in a list the hypotheses contained in a selected empirical fault analyses and, following selection of the hypotheses, to store the selected hypotheses in the log of the current fault cause analysis; and
   use stored data from the log of the current fault cause analysis, to process the general fault model, and in the hypotheses verification process of the selected hypotheses and, after the hypotheses verification process, to store the determined fault causes in the log of the current fault cause analysis.

4. The system according to claim 1, wherein said processing device:
   displays to the user the fault event list and stores a fault event selected by the user or selected fault events in the log of the current fault cause analysis;
   uses said first comparator to compare a description of the fault event belonging to a selected current fault event with contents of a general fault model and, from the general fault model, displays suitable fault trees for carrying out a further analysis and, following selection of a fault tree, stores the fault tree in the log of the current fault cause analysis;

uses said second comparator to compare the description of the selected current fault event with empirical fault analyses from said empirical database and displays suitable empirical fault analyses, and, following selection of the empirical fault analyses, stores the empirical fault analyses in the log of the current fault cause analysis;

uses said hypothesis selector to summarize and display in a list the hypotheses contained in a selected empirical fault analyses and, following selection of the hypotheses, stores the selected hypotheses in the log of the current fault cause analysis; and uses stored data from the log of the current fault cause analysis, to process the general fault model and in the hypotheses verification process and, after the hypotheses verification process, stores the determined fault causes in the log of the current fault cause analysis.

* * * * *

UNITED STATES PATENT AND TRADEMARK OFFICE
CERTIFICATE OF CORRECTION

| | | |
|---|---|---|
| PATENT NO. | : 6,952,658 B2 | Page 1 of 1 |
| APPLICATION NO. | : 10/364004 | |
| DATED | : October 4, 2005 | |
| INVENTOR(S) | : Manuel Greulich et al. | |

It is certified that error appears in the above-identified patent and that said Letters Patent is hereby corrected as shown below:

Column 1, lines 3-4 between the title and the subheading "BACKGROUND OF THE INVENTION" the following paragraph is inserted:

-- CROSS-REFERENCE TO RELATED APPLICATION

This application is a continuing application, under 35 U.S.C § 120, of international application PCT/EP00/07730, filed August 9, 2000, which designated the United States. --

Signed and Sealed this

Twenty-fifth Day of August, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 6,952,658 B2 | Page 1 of 1 |
| APPLICATION NO. | : 10/364004 | |
| DATED | : October 4, 2005 | |
| INVENTOR(S) | : Manuel Greulich et al. | |

It is certified that error appears in the above-identified patent and that said Letters Patent is hereby corrected as shown below:

Column 1, lines 3-4 between the title and the subheading "BACKGROUND OF THE INVENTION" the following paragraph is inserted:

-- CROSS-REFERENCE TO RELATED APPLICATION

This application is a continuation under 35 U.S.C § 120, of international application PCT/EP00/07730, filed August 9, 2000, which designated the United States. --

This certificate supersedes the Certificate of Correction issued August 25, 2009.

Signed and Sealed this

Fifteenth Day of December, 2009

David J. Kappos
*Director of the United States Patent and Trademark Office*